United States Patent [19]

Shouji et al.

[11] Patent Number: 4,786,969
[45] Date of Patent: Nov. 22, 1988

[54] BLACK LEVEL CORRECTION CIRCUIT FOR VIDEO CAMERA

[75] Inventors: Hiroyuki Shouji, Tokyo; Eiji Tamura, Kanagawa, both of Japan

[73] Assignee: Sony Corporation, Tokyo, Japan

[21] Appl. No.: 29,985

[22] Filed: Mar. 25, 1987

[30] Foreign Application Priority Data

Apr. 8, 1986 [JP] Japan .................................. 61-80887

[51] Int. Cl.⁴ ............................................. H04N 5/16
[52] U.S. Cl. ............................... 358/171; 358/213.16; 358/221
[58] Field of Search ..................... 358/171, 213.16, 221

[56] References Cited

U.S. PATENT DOCUMENTS 4,274,107  6/1981  Tamura ............................... 358/171
4,556,912 12/1985  Yamanaka ...................... 358/213.16
4,631,589 12/1986  Hongu ................................. 358/171

Primary Examiner—Tommy P. Chin
Attorney, Agent, or Firm—Lewis H. Eslinger; Jay H. Maioli

[57] ABSTRACT

A circuit for cancelling the effects of dark current in a video camera by making a correction such that there is no variation in the black level values produced when the gain of a video amplifier for amplifying an image pick-up output is switched between high and low levels in the dark condition. Provision is made to provide correction when the camera is in the stabilized state and also to detect whether a corrected black level value falls within a clip level, typically found in the video amplifier system, in order to obtain proper black level correction.

8 Claims, 3 Drawing Sheets

BLACK LEVEL CORRECTION CIRCUIT FOR VIDEO CAMERA

BACKGROUND OF THE INVENTION

1. Field of the Invention

This invention relates generally to a video camera and, more particularly, to apparatus for correcting black level values in a video camera.

2. Description of the Background

It is known that all video cameras, regardless of the particular type of image pick-up device employed, produce a video signal even when there is no light incident thereon. This video output level with no incident light is known as the black level value and is due to the so-called dark current of the photosensitive device. Because such video output is present in the absence of any light falling on the image pick-up device, it is necessary to calibrate the video camera by providing some cancelling signal to cancel out the dark current present in that individual camera. This is necessary, of course, because otherwise there would be a video signal output level even though no light was being detected. Furthermore, because it is known that the video output level will vary in relation to changes in the ambient temperature and fluctuations in the bias current, for example, system calibration and/or black level cancellation must be carried out periodically. Also, if black level cancellation has been performed incompletely in the case of a color video camera of the multi-tube or multiple device kind, then the black balance of the camera will be disturbed. Also, drift in the video amplifier and in the video processor, which are a part of the video camera circuitry, will lead to variations in the black level and/or disturbance of the black balance. Thus, it is necessary to perform a detection operation to learn whether or not the black level cancellation has been completely performed at the final output stage of the video signal processing system.

The video signal processing circuit typically employed with this kind of video camera includes a video amplifier that has a gain which is switchable between two levels according to the degree of brightness of the subject being picked up. This introduces a further problem in black level cancelling because the black level of the output amplifier may vary upon the switching of the gain. Therefore, only if there is no change in black level when the gain is switched from one level to the other can it be determined that virtually complete black level cancellation has taken place. The known systems of this kind all simply make one black level cancellation measurement relative to the video amplifier and provide that cancellation signal regardless of the movement of the gain control switch in the video amplifier.

The approaches known heretofore to achieve black level cancellation have all had various drawbacks, for example, because the black level changes relatively slowly it is known to provide a fixed time delay before performing the black level correction operation. That is, a rather lengthy time delay is imposed to permit the black level to become stabilized before making the appropriate measurements in order to provide the cancellation signal. Nevertheless, this has not been totally suitable because the black level will frequently remain unstable even after the time delay has elapsed and, thus, correction becomes inaccurate. In other words, a fixed time delay is not always appropriate because stabilization does not always occur within the predetermined time or it might occur quite rapidly and the delay time slows down the process. Furthermore, the transfer characteristic of the video signal processing circuit is generally a complex nonlinear characteristic and a complete black level cancellation cannot be obtained by one single cancellation and several black level corrections must be made through switching of the gain of the video amplifier until a converged state is reached. Obviously, this kind of calibration or correction procedure requires a long time. In addition, the nonlinear characteristic of the video signal processor typically employs a dead zone, and the proper black level cancellation signal cannot be obtained in close proximity to the real black level because of this dead zone and, thus, black level cancellation is incomplete.

OBJECTS AND SUMMARY OF THE INVENTION

Accordingly, it is an object of the present invention to provide apparatus for cancelling black level output in a video camera that can eliminate the above-noted defects inherent in the prior art.

Another object of the present invention is to provide a black level correction circuit that can provide black level cancellation having higher accuracy and with a quicker processing speed than such systems known heretofore.

In accordance with an aspect of the present invention, a black level correction circuit for a video camera is provided and is useful with a video amplifier that has a gain switchable between two known levels. When the lens of the camera is closed to eliminate any incident light, a correction signal is provided for the video amplifier that can correct for the black level values of the amplifier both before and after the gain of the video amplifier has been switched. A decision making circuit is provided to compare two black level values that are obtained at time points with a predetermined time interval therebetween, when there is no incident light in order to determine that the black level correcting signal has been stabilized by detecting that there is no change between the two black level values. Similarly, the inventive correction circuit provides that the correction signal is based upon the difference between the black level values obtained using the detection circuit both before and after the gain of the video amplifier has been changed in order to decrease any difference in the black levels at the various amplifier settings. The black level correction circuit also includes a looping system included in the detection and decision making circuits in order to converge the black level correction value so that the detection of the black level difference and delivery of the correction value are repeated for each switching of the amplifier gain.

According to another aspect of the present invention provision is made to provide clip detection to detect that the corrected black level is beneath the black clip level of the video amplifier. Such clip detection circuit provides for the comparison of the correction value with a predetermined reference value and then following such comparison to cause the fixed value of the output to be utilized in place of the calculated correction value and then the above-mentioned looping circuit to be operated again.

The above and other objects, features, and advantages of the present invention will become apparent from the following detailed description of the illustrative embodiments thereof to be read in conjunction with the accompanying drawings.

DETAILED DESCRIPTION OF PREFERRED EMBODIMENT

Figure 1:
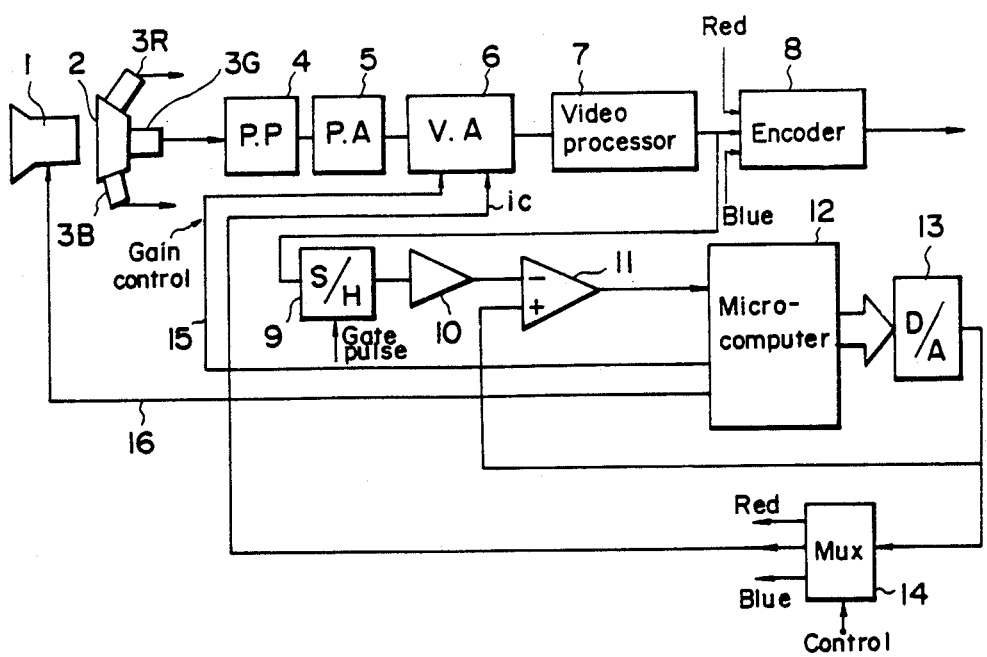
FIG. 1 is a block diagram of a black level correction circuit for use with a video camera according to an embodiment of the present invention.

In the embodiment of the black level correction system as shown in FIG. 1, the video camera is a color video camera of the three-tube kind employing three image pick-up tubes or, alternatively, employing three, solid-state, image pick-up devices. The light reflected from the image is passed through a suitable lens system 1 of the conventional kind that includes an iris or adjustable aperture as is well known. The light passing through the lens system 1 is then separated optically into colors by a prism 2 and is incident upon the photosensitive surfaces of the image pick-up devices 3R, 3G, and 3B, which correspond to the colors red, green, and blue, respectively. Although this embodiment involves a color video camera, the present invention applies equally to a black and white video system. The outputs from the image pick-up devices are then passed through a series of amplifiers and video processors that are provided for each specific color. For example, the signal produced by green image pick-up device 3G is fed through a pre-preamplifier 4, a pre-amplifier 5, a video amplifier 6, and a video processing circuit 7, whose output is then fed to an encoder 8. It is understood that a similar series circuit is provided for the red image pick-up device 3R and for the blue image pick-up device 3B. Video amplifier 6 is of the kind that is switchable between at least two known gain levels. Thus, encoder 8 will have three inputs fed thereto corresponding to the three outputs from the three image pick-up devices 3R, 3G, 3B, respectively. Encoder 8 is simply a converter that converts the video signal into the NTSC system, for example, and provides the video output to the user device.

Figure 2:
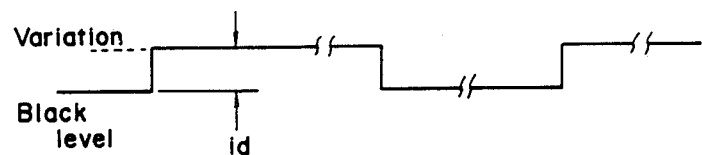
FIG. 2 is a waveform representing the black level output of a video camera.

FIG. 2 is intended to represent the recognized phenomenon that the black level output of each color system of the video processing circuit 7, under the conditions that there is no incident light, will vary depending upon ambient temperature, changes in bias current, and the like. This variation in black level output is represented as is in FIG. 2 and it is this variation that is cancelled by the present invention.

Referring back to FIG. 1, and assuming that an automatic black level setting switch (not shown) mounted on the camera has been actuated, a lens close command will be produced by a controller 12, which in this embodiment is a microcomputer. This lens close command is fed to the lens system 1 to close the iris or aperture thereof to establish the condition under which no light is incident upon the photosensitive devices. In this condition, the black level output of the video processing circuit 7 is fed through a sample and hold circuit 9 to an amplifier 10. Sample and hold circuit 9 is gated based on a gating signal corresponding to 70% of the center of the screen, for example, and this gate signal is generated by shaping a horizontal sync signal that is available in the horizontal synchronization portion of the video camera. Such waveform shaping may be achieved utilizing monostable multi-vibrators. The output of amplifier 10 represents the extracted black level signal and is fed to one input of a comparator 11, whose output is fed to the microcomputer 12. One digital output signal of microcomputer 12 is fed through a digital-to-analog (D/A) converter 13 whose output is the cancellation output and is also fed back to the other input of comparator 11. The combination of elements formed by comparator 11, microcomputer 12, and D/A converter 13 operates as an analog-to-digital converter that converts the input to microcomputer 12 to a digital quantity.

Another function of microcomputer 12 is to provide the gain ON/OFF command to video amplifier 6, whereby in this particular embodiment the gain of amplifier 6 is switched between 0 dB and 9 dB. Thus, the switchable gain amplifier permits the above-described detection of the black level values being performed for each of the video amplifier gains. Microcomputer 12 calculates the correction amount necessary to eliminate the difference between the black levels at the different gains for the three colors and can produce such correction amount in the form of a correction signal ic fed through D/A converter 13 and a multiplexer-type circuit 14 fed to the video amplifier 6 for each of the three color systems. Thus, the red output and blue output from multiplexer 14 is fed to the red and blue variable amplifier (not shown).

In regard to multiplexer 14, which receives the correction signal from D/A converter 13, this circuit operates similar to a sample and hold circuit and is under control of a control signal that simply commands or informs the multiplexer which of the various colors has been selected to have its black level controlled; such control signal might be produced by a mode control switch. Thus, the control signal ic is the signal fed to multiplexer 14, so that the output of D/A converter 13 is connected to the video amplifier of the red channel and this voltage for the red channel from D/A converter 13 will be held as an output by multiplexer 14 even after multiplexer 14 changes the connection condition so that the output of D/A converter 13 is connected to video amplifier 6 for the green channel, for example. Similarly, that output is then held during the time that the blue channel is then corrected.

Figure 3:
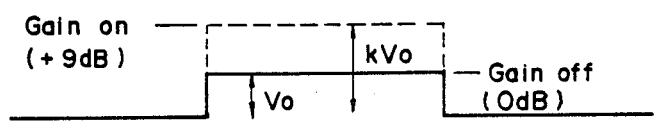
FIG. 3 is a waveform illustrating a change in black level based upon corresponding changes in video amplifier gain.

Referring to FIG. 3, the black level in the condition when no light is incident upon the photosensitive surfaces and when the video amplifier gain increase is held OFF (0 dB) is represented by the V0 and when the gain increase is turned ON (9 dB) is represented as kV0. Then, if the values taken or fed into microcomputer 12 at the times corresponding to the gain being ON and OFF, respectively, are represented by Von and Voff then:

$$V0 = \frac{Von - Voff}{k - 1}$$

It is the difference value necessary to converge this expression to zero that can be used for cancelling the black level variation.

In actuality, video processing circuit 7 has a nonlinear response characteristic and, therefore, complete black level cancelling cannot be achieved by only a one-time correction and detections of the black level difference and corrections based thereon must be repeated until the absolute value of the difference between Von - Voff is less than or equal to a fixed limit, which in this embodiment is one bit. This one bit is, of course, the least significant bit (LSB) and in this system the control signal word is selected as having eight bits. This difference signal will be described hereinbelow, however, it is noted that in the practical embodiments of systems of this kind, the difference value that is calculated and used to generate the control signal, which is actually fed to the video amplifier 6, is somewhat different than the actual eight bit difference value. In this embodiment both the calculated difference and the actual control signal can have eight bits.

Figure 4:
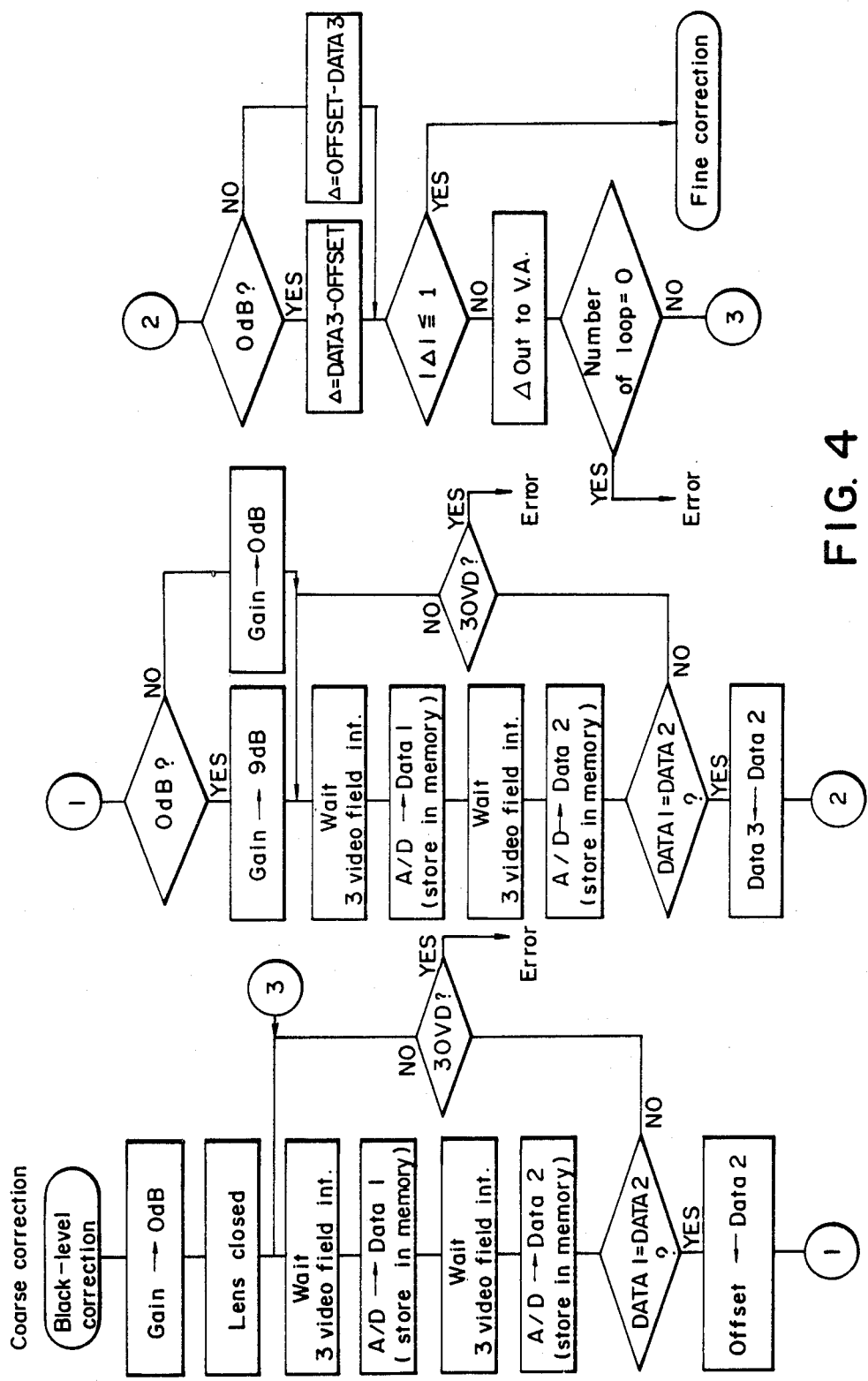
FIG. 4 is a flow chart representing a process performed by the apparatus of FIG. 1 in effecting coarse correction of the black level according to the present invention.
Figure 5:
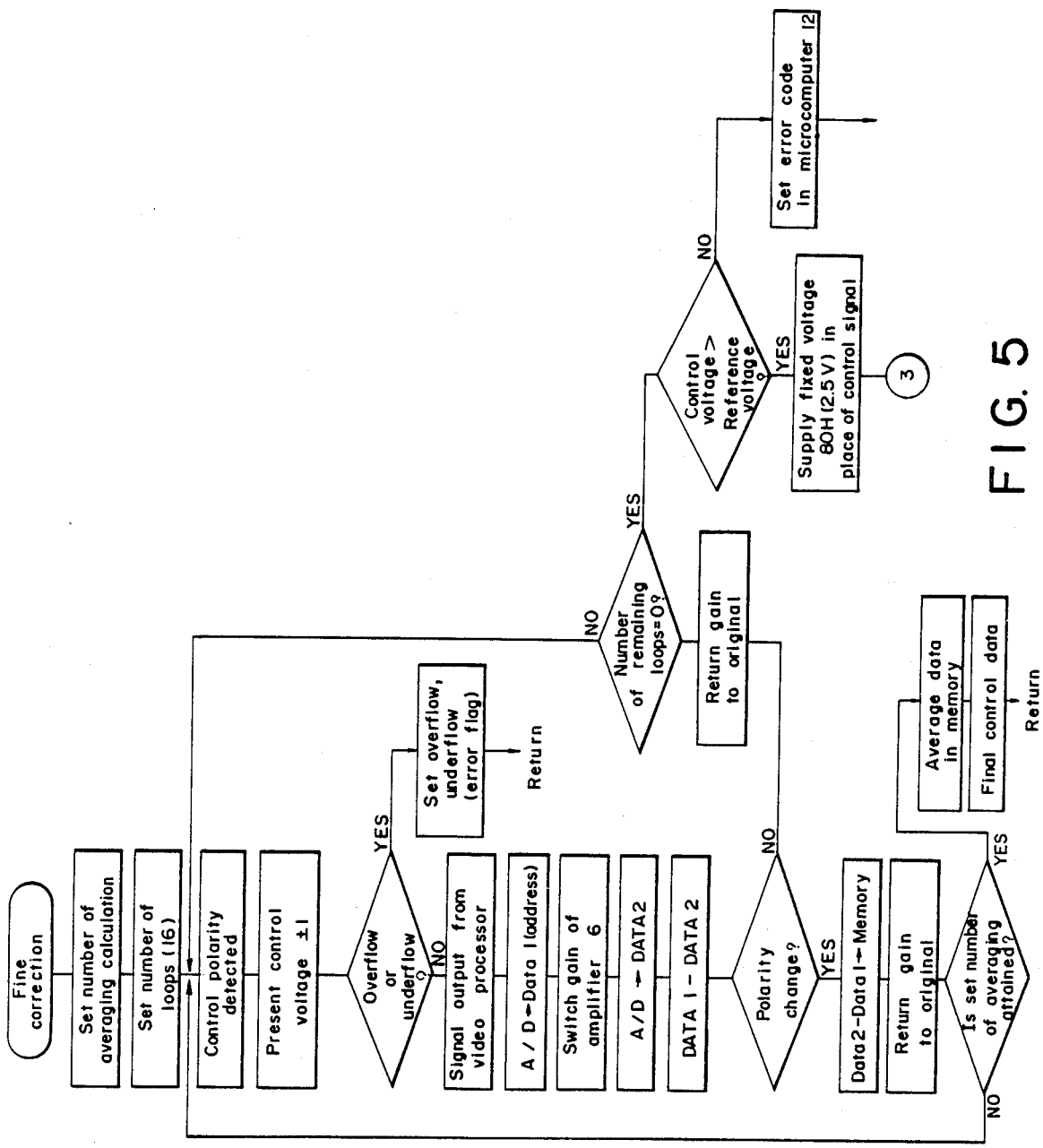
FIG. 5 is a flow chart representing a process for performing fine correction of the black level according to the present invention.

FIGS. 4 and 5 are flow charts representing the processing and method steps that are undergone in achieving the above-described black level correction, as might take place in the microcomputer 12.

The coarse correction is performed first and, thus, as shown in FIG. 4, once a black level correction has been determined to take place by the actuation of a switch, for example, the gain increase of video amplifier 6 is turned OFF by a signal on line 15 fed to video amplifier 6 and then a command is issued on line 16 to close the iris of lens system 1. Then, after waiting a short time period corresponding to three video fields, the actual black level signal is taken into microcomputer 12 as DATA 1 and, after waiting another three video field period, the black level signal is again taken into microcomputer 12 as DATA 2. Then in a decisional step, it is determined whether or not DATA 1 =DATA 2 and if they are equal it is determined that the black level is in a stabilized state and DATA 2 is then stored as the offset value (OFFSET). In the event that DATA 1 does not equal DATA 2 then the process returns to step 3 and similar comparisons are repeated, provided that such loop iterations have not exceeded a predetermined time, for example, 30 video field intervals. Thus, if the state in which DATA 1 equals DATA 2 has not been reached after the loop has been repeated approximately ten times, an error indication is raised. By determining whether or not the black level is in a completely stabilized state, as described above, the detection accuracy provided by the present invention becomes higher and a correct black level signal can be detected quicker than in the conventional method in which the black level is considered simply to have been stabilized after waiting a predetermined period of time, which typically is far greater than the six video fields involved in the instant embodiment.

Upon storing DATA 2 as the offset value, the process advances to ① and in order to switch the gain of the video amplifier 6 it is determined whether or not the gain at that time is 0 dB and, if so, the gain is then increased to the 9 dB level corresponding to the gain increase being ON. If the gain is already set at 9 dB then the preceding steps were conducted with that gain and then the gain would be switched back to 0 dB, that is, the gain increase would be switched OFF. In any event, after the appropriate gain increase switching has occurred, a similar data detecting procedure in accordance with the above-described method at ③ is followed and then the stabilized black level value is taken into the microcomputer 12 as DATA 3.

The processing then advances to ② and the difference Δ between the data before and after the switching of the gain, which correspond to OFFSET and DATA 3 is calculated. At such time, the orientation of the difference is determined according to the current gain value, that is, the data received at 9 dB is always subtracted from the data produced at 0 dB. Thus, if the current gain is 9 dB then the data at 9 dB after the gain switching (DATA 3) is subtracted from the data at 0 dB before the switching (OFFSET). Conversely, if the current gain is 0 dB then the data at 9 dB before the switching (OFFSET) is subtracted from the data at 0 dB after the switching DATA 3.

If the absolute value of Δ becomes one bit or zero, as mentioned above, it is regarded to have converged and the sequence advances to the next step for precision or fine correction. Nevertheless, because the converged state is typically not reached in one iteration, the value Δ is supplied as the correction value ic as described in FIG. 1 to the video amplifier 6 through D/A converter 13 and multiplexer circuit 14. Then, the sequence returns to 3 and the process for detecting the black levels before the switching of the gain, the calculation of the difference, and the delivery of the correction value until the absolute value of the difference is less than or equal to one bit, is repeated. The maximum number of iterations for the conversion loops to be repeated in this embodiment is set to sixteen, and when the count being counted down becomes zero, that is, the loop has been repeated for sixteen times, an error condition is indicated.

If the switching of the gain in the loop the first time was 0 dB to 9 dB then for the second time the switching of the loop becomes 9 dB to 0 dB, as apparent from the above-description, that is, the difference value Δ is calculated each time the switching between 0 dB and 9 dB is made for the correction of the black level. Therefore, the converging speed can be as high as two times as fast as that of systems known heretofore.

Assuming that the coarse correction has occurred and the difference is less than one bit (LSB) then the fine correction process as shown in FIG. 5 takes place. More specifically, the first step in the fine or precision correction operation is to set the number of times for taking in the data for the averaging calculation, which for example might be two times and then the number of loops is also set, which for example may be sixteen. Then, the direction of the current control, that is, the sign of the correction value ic is determined and the data amendment is made so that the control voltage, which in effect is the correction value ic, may be corrected in the reverse direction by adding a bit or subtracting a bit. At such time, it is also determined to check for so-called overflow or underflow and if any such overflow or underflow is found then an error flag is set. Overflow or underflow in this context means that the black level can not be adjusted unless some condition of the circuit is changed. These circumstances occur only rarely but, nevertheless, this checking step is provided as a safety factor. More particularly, let is be assumed that in the coarse adjustment process the control signal value becomes 255, that is, all ones, and then in the fine adjustment process another one must be added to the control signal, the control signal would ultimately become all zeros, and this is an overflow condition indicating an error. Assuming in this example that no overflow condition is present, the amended correction value is output from the video processor and the obtained black level is taken in as DATA 1. Next, the gain of video amplifier 6 is switched nd the next black level data is taken in as DATA 2. Thereafter, the above-described amendment by adding or subtracting one bit is repeated until the result of the calculation (DATA 1 - DATA 2) changes the polarity of its sign. More specifically, if the polarity remains the same, the gain will be restored and the correction voltage data is provided with another amendment of plus or minus one bit within the limits of the number of the loop times, as set at the beginning of the process. On the other hand, if the polarity does change this indicates that the target point for establishing DATA 1 =DATA 2 has been passed and, thus, DATA 2 at that time will be stored in the memory. Thereafter, the gain is restored and similar operations are repeated in order to obtain a plurality of DATA 2 values for the averaging calculation. When the number of times for inputting data for the averaging calculation has been reached, the averaging calculation takes place based on this number of DATA 2 values that have been stored in the memory and the result is fixed in the memory, as the final control data.

As described above, video processing circuit 7 typically has a nonlinear transfer characteristic and such transfer characteristic is the so-called linear clip. This means that a signal clip is provided in the vicinity of the real black level, so that the circuit will not be responsive to noise. Thus, there is present a dead zone in the input-/output characteristic of video processing circuit 7. If, when the lens has been closed, the corrected black level falls within the dead zone the output of the video processing circuit will not change if the correction value is provided with increases or decreases of one bit in the fine or precision correction process. Therefore, the black level will not produce any difference even if the gain is switched. This condition, that is, the falling within the linear clip, can be detected by checking whether the number of executed amendment loops exceeds the preset number, which in the above example was sixteen. If this is detected, it is determined whether the control voltage (ic) exceeds a reference value such as, in hexadecimal notation, digital data represented by $C0_H$ that corresponds to the clip level and, if it is over that value, it is determined that the black level is caught in the linear clip and the control voltage is lowered to 2.5 volts, which corresponds to $80_H$ in hexadecimal notation. Since the black level is thereby set higher, the procedure from 3 in FIG. 4 is then commenced over again. Note that in the present control system the black level tends upwardly if the correction value or control voltage ic is lowered. In addition, when the control voltage is below a reference value, and the variance output can not be obtained through the plus or minus amending of the data, then the variance is disposed of as an error.

The above description is given on a single preferred embodiment of the invention, but it will be apparent that many modifications and variations could be effected by one skilled in the art without departing form the spirit or scope of the novel concepts of the invention, which should be determined by the appended claims.

What is claimed is:

1. A black level correcting circuit for a video camera having image pick-up means for generating a video signal corresponding to an image, video signal amplifying means for amplifying the video signal from said image pick-up means, the gain of said video signal amplifier means being variable and being switchable between at least two fixed values and video signal processing means that clips a black level signal below a predetermined level and that is supplied with the output of said video signal amplifying means for processing the same, said black level correcting circuit comprising:

control means for controlling said image pick-up means such that no light enters said image pick-up means in a black level correcting mode;

detecting means for detecting the level of the output of said video signal processing means when no light enters said image pickup means at predetermined time points in the video signal;

means for judging whether a difference between the outputs of said detecting means detected at two time points with a predetermined interval of time therebetween is below a threshold value and determining therefrom that the black level is stabilized;

correcting means for generating a correcting signal upon a chance in stabilized black levels from said means for judging before and after switching the gain of said video signal amplifying means between said at least two fixed levels and for supplying said correcting signal to said video signal amplifying means to vary the gain thereof for decreasing said change; and said correcting means further detects that the black level is below the predetermined level by comparing said correcting signal and a predetermined reference level and said correcting means outputs a fixed value instead of the correcting signal and said means for judging is operated again.

2. Black level correcting circuit according to claim 1, wherein said detecting means includes a sampling and hold circuit for sampling the output of said video signal processing means.

3. Black level correcting circuit according to claim 1, wherein said means for correcting detects the polarity of the correcting signal and amends the correcting signal by a predetermined amount in a polarity opposite to the detected polarity.

4. Black level correcting circuit according to claim 3, wherein said means for correcting determine whether said correcting signal after having been corrected in a direction opposite to its detected polarity exceeds a predetermined system level and, if so, sets an error signal upon said level being exceeded, said error signal indicating the black level can not be corrected.

5. A method of correcting a black level signal in a video camera having image pick-up means for generating a video signal corresponding to an image, a video signal amplifier for amplifying the video signal from the image pick-up means, a gain of said video signal amplifier being variable and being switchable between at least two fixed levels, and a video signal processor that clip a black level signal below a predetermined level and that is supplied with the output of said video signal amplifier for processing the same, the method for correcting a black level signal comprising the steps of:

controlling the image pick-up means such that no light enters therein to place the video camera in a black level correcting mode;

detecting the level of the output of the video signal processor when no light enters the video image pick-up means;

judging whether a difference between the output of the video signal processor detected at two points with a predetermined interval of time therebetween is below a threshold value and determining therefrom whether the black level has been stabilized;

generating a correcting signal upon a change in stabilized black levels following said step of judging before and after the switching of the gain of video signal amplifier and supplying said correcting signal to the video signal amplifier to vary the gain thereof and decrease said change;

converging said correcting signal by repeatedly performing said detecting operations, said judging operation, and said generation of a correcting signal; and detecting a clip condition by determining that the black level signal after the step of varying the gain of the video signal amplifier is below the predetermined level and comparing said correcting signal and a predetermined reference level and causing a fixed value to be generated in place of generating the correcting signal, and performing said step of converging once again.

6. A method of correcting a black level signal according to claim 5, wherein said step of detecting includes sampling the output of said video signal processor and converting the sampled signal to a digital signal.

7. A method of correcting a black level signal according to claim 5, wherein said step of converging includes detecting the polarity of the correcting signal and amending the correcting signal by a predetermined amount in a polarity opposite to the detected polarity.

8. A method of correcting a black level signal according to claim 7, further comprising the step of determining whether said correcting signal after having been corrected in a direction opposite to its detected polarity exceeds a predetermined system level and setting an error signal upon said level being exceeded, said error signal indicating said black level signal can not be corrected.

* * * * *

UNITED STATES PATENT AND TRADEMARK OFFICE
CERTIFICATE OF CORRECTION

PATENT NO. : 4,786,969

DATED : November 22, 1988

INVENTOR(S) : Hiroyuki Shouji and Eiji Tamura

It is certified that error appears in the above-identified patent and that said Letters Patent is hereby corrected as shown below:

Column 1, line 56, change "relativelv" to --relatively--.

Column 7, line 5, change "nd" to --and--.

IN CLAIMS

Column 8, line 23, change "chance" to --change--;

line 46, change "determine" to --determines--;

line 58, change "clip" to --clips--.

Column 9, line 2, after "two" insert --time.

Signed and Sealed this

Thirtieth Day of May, 1989

Attest:

DONALD J. QUIGG

Attesting Officer

Commissioner of Patents and Trademarks